United States Patent [19]
Tanizawa

[11] Patent Number: 5,877,039
[45] Date of Patent: *Mar. 2, 1999

[54] METHOD OF MAKING A SEMICONDUCTOR PRESSURE SENSOR

[75] Inventor: Yukihiko Tanizawa, Chiryu, Japan

[73] Assignee: Nippondenso Company, Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 668,005

[22] Filed: Jun. 19, 1996

Related U.S. Application Data

[60] Continuation of Ser. No. 164,804, Dec. 10, 1993, abandoned, which is a division of Ser. No. 756,223, Sep. 9, 1991, Pat. No. 5,289,721.

[30] Foreign Application Priority Data

Sep. 10, 1990 [JP] Japan ................................... 2-240343
Apr. 19, 1991 [JP] Japan ................................... 3-88614

[51] Int. Cl.$^6$ ................................................. H01L 21/00
[52] U.S. Cl. ............................................................ 438/53
[58] Field of Search ............................. 437/228 H, 979, 437/927; 73/726, 727; 257/417, 418, 419; 438/53, 50

[56] References Cited

U.S. PATENT DOCUMENTS

| Re. 34,893 | 4/1995 | Fujii et al. ................................. 257/419 |
| 4,439,752 | 3/1984 | Starr ............................................. 73/727 |
| 4,576,052 | 3/1986 | Sugiyama ..................................... 73/727 |
| 4,588,472 | 5/1986 | Shimizu ....................................... 257/419 |
| 4,672,411 | 6/1987 | Shimizu et al. ............................ 257/419 |
| 4,691,575 | 9/1987 | Sonderegger et al. . |
| 4,745,812 | 5/1988 | Amazeen et al. ...................... 73/862.04 |
| 4,986,131 | 1/1991 | Sugiyama et al. ......................... 73/766 |
| 5,145,810 | 9/1992 | Matsumi ................................. 437/228 |
| 5,259,248 | 11/1993 | Ugai et al. ............................... 73/727 |
| 5,456,117 | 10/1995 | Imaeda et al. ............................ 73/727 |
| 5,580,639 | 12/1996 | Togawa et al. .......................... 428/156 |

FOREIGN PATENT DOCUMENTS

| 55-24408 | 2/1980 | Japan ............................ H01L 29/84 |
| 56-80174 | 7/1981 | Japan . |
| 60-13314 | 1/1985 | Japan . |
| 63-144582 | 6/1986 | Japan . |
| 62-259476 | 11/1987 | Japan . |

OTHER PUBLICATIONS

Greenwood, J.C., "Silicon in Mechanical Sensors", *J. Phys. E: Sci., Instrum.* 21:114–1128 (1988) No Month.
Kayal, H.A. and Rauch, N., "Anwendungsspezifische Intelligente Sensoren", *Elektronik* 9:112–117 (Apr. 29, 1988).
Schubert, D. et al., "Drucksensor mit piezoresistiven Widerstanden aus polykristallinem Silizium", *msr*, Berlin 31(8):341–344 (1988) No Month.
English translation of German Official Action dated May 15, 1996, issued in a counterpart foreign application.

*Primary Examiner*—Brian Dutton
*Attorney, Agent, or Firm*—Pillsbury Madison & Sutro LLP

[57] ABSTRACT

A semiconductor pressure sensor comprises a silicon substrate having a surface orientation of substantially (110), a diaphragm formed from the substrate, strain gauges disposed on the diaphragm, and a base joined with the substrate. The diaphragm has an octagonal shape whose sides are orthogonal to axes <100>, <110>, and <111>, respectively. This sensor causes substantially no output error and no fluctuation between output characteristics of the strain gauges irrespective of a change in temperature.

13 Claims, 15 Drawing Sheets

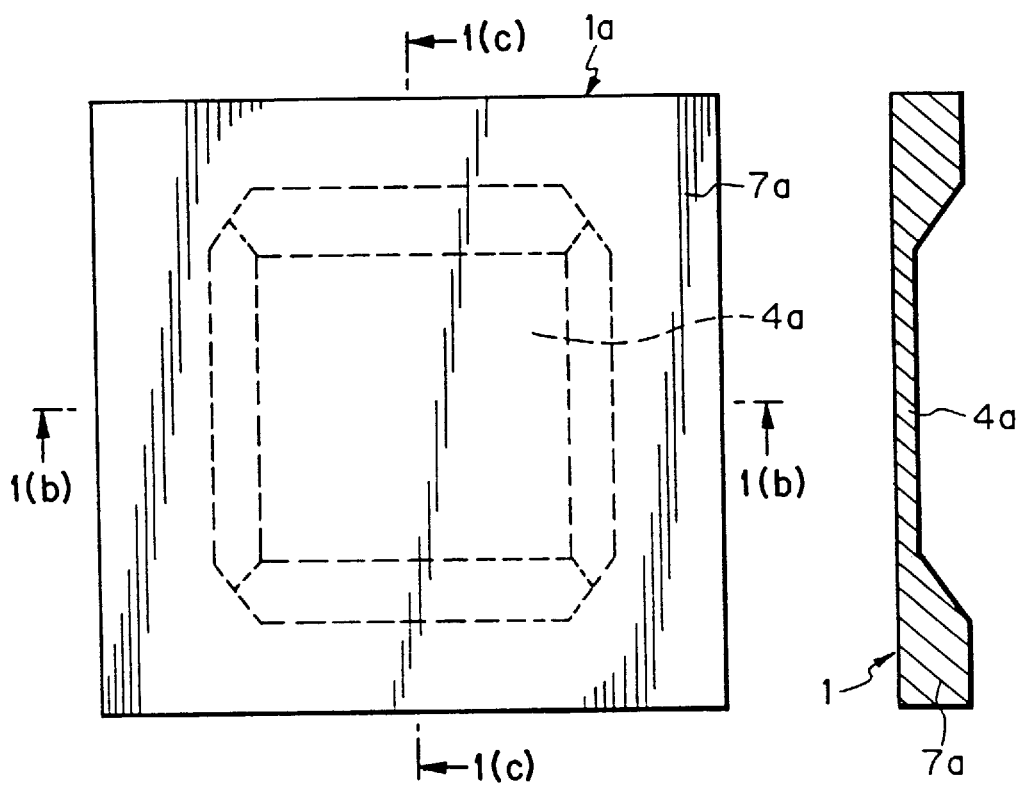
Fig. 1(a) PRIOR ART
Fig. 1(c) PRIOR ART
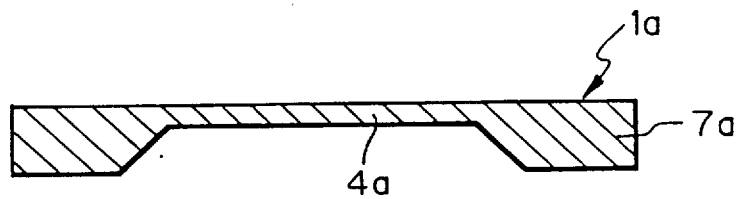
Fig. 1(b) PRIOR ART

Fig. 5(a)
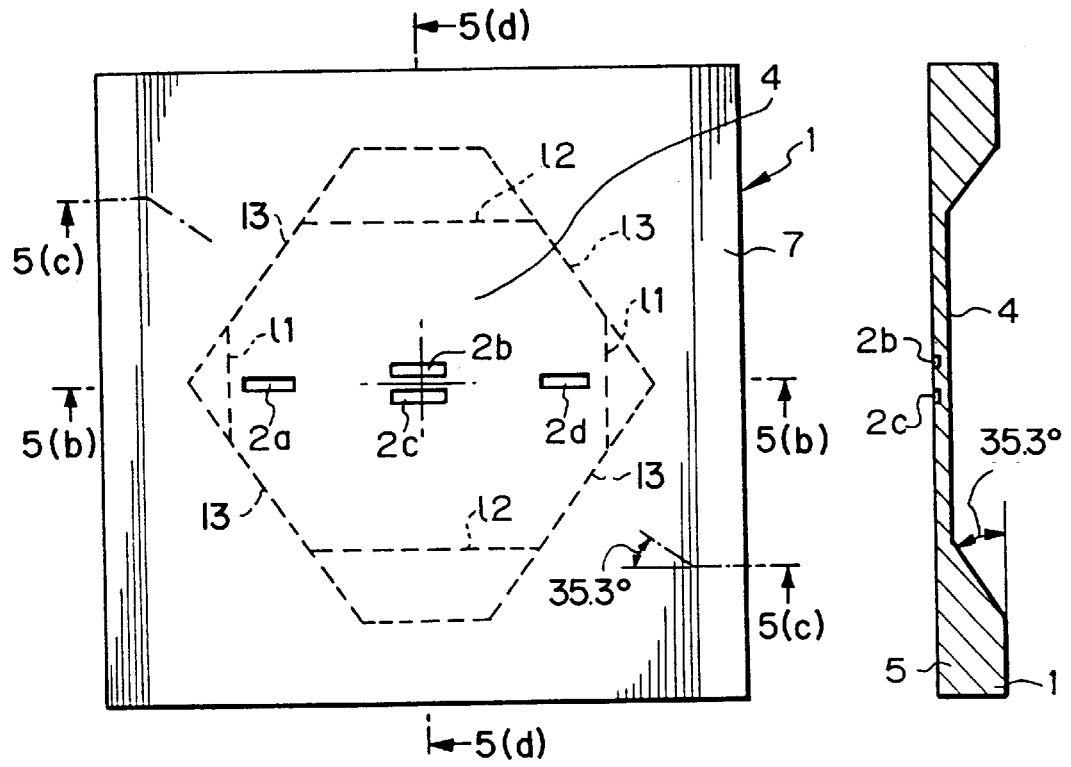
Fig. 5(d)
Fig. 5(b)
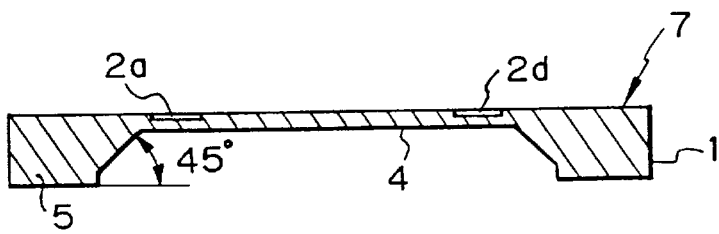
Fig. 5(c)
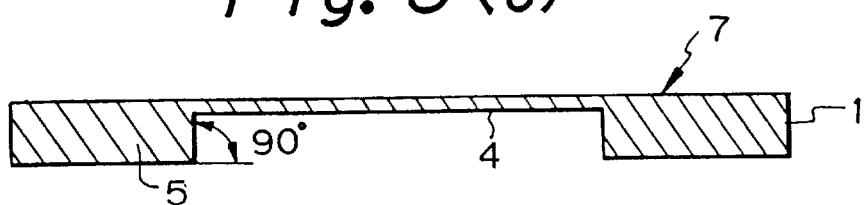

METHOD OF MAKING A SEMICONDUCTOR PRESSURE SENSOR

This is a continuation of application Ser. No. 08/164,804, filed on Dec. 10, 1993, now abandoned, which was abandoned upon the filing hereof which is a divisional application of application Ser. No. 07/756,223, filed on Sep. 9, 1991, issued as U.S. Pat. No. 5,289,721 on Mar. 1, 1994.

BACKGROUND OF THE INVENTION

1. Field of the Invention

This invention relates to a semiconductor pressure sensor having a diaphragm formed by anisotropically etching a monocrystalline silicon substrate having a surface orientation of substantially (110) or (100).

2. Description of the Related Art

FIG. 1 shows a conventional semiconductor pressure sensor. This semiconductor pressure sensor has a recessed diaphragm 4a having a substantially square shape formed by anisotropically etching a monocrystalline silicon substrate 1a having a surface orientation of substantially (110). With this surface orientation, strain gauges for forming a bridge circuit are arranged on the periphery and in the center of the diaphragm 4a.

In FIG. 2, a non-diaphragm area 5 of the substrate 1a is joined with a base 3 made of, for example, Pyrex (trade mark) glass. The base 3 has a pressure introducing hole 31 through which pressure is introduced from the outside to a recessed face of the diaphragm 4.

Japanese Examined Patent Publication No. 60-13314 discloses another example of the semiconductor pressure sensor. This sensor has an octagonal diaphragm with sides extending parallel with two different crystal axes on the surface of a semiconductor substrate having a surface orientation of (100). In the sensor having this surface orientation, all strain gauges are usually arranged on the periphery of the diaphragm. This arrangement prevents a local concentration of stress and increases the maximum allowable applied pressure.

In the conventional semiconductor pressure sensor comprising the monocrystalline silicon substrate joined with the base, the diaphragm is subjected to thermal stress due to a difference in the thermal expansion coefficient between the substrate and the base. The thermal stress in the diaphragm fluctuates and causes the bridge circuit composed of the strain gauges to provide a thermal stress output. This output is an unwanted signal component (an offset voltage) mixed with a pressure signal. The offset voltage is usually nonlinear with respect to a temperature change and difficult to be compensated for in a simple electronic circuit, thereby deteriorating the accuracy of the pressure sensor. No effective measures have been proposed so far to solve this problem.

When fabricating semiconductor pressure sensors, it is also known to use a semiconductor substrate with respect to each of the two principal planes (110) and (100) and etch (preferably anisotropically) the substrate to form a diaphragm. This will be explained with reference to FIGS. 3 and 4.

In the figures, a silicon substrate 1a has a surface orientation of (110). Strain gauges 2a are symmetrically arranged to form a bridge circuit on a front principal plane of the silicon substrate 1a. With the center of symmetry of the strain gauges serving as an etching center, a back principal plane of the silicon substrate 1a is anisotropically etched into a truncated pyramid to form a thin diaphragm 4a.

In a direction orthogonal to the principal plane, the center "s" of an etching start surface S2 defined by a photo mask from where the anisotropic etching is carried out agrees with an intermediate point (gauge center) "g" of the strain gauges 2a.

The diaphragm 4a deflects due to a difference in pressure between the front and back faces thereof, and accordingly, the strain gauges change their resistances to provide a voltage signal from an output terminal of the bridge circuit.

A semiconductor integrated circuit, usually arranged as an external circuit includes bipolar transistors for amplifying the signal from the bridge circuit and compensating the signal for temperature. The external circuit may be arranged on the silicon substrate 1a to reduce the size of the semiconductor pressure sensor. To fabricate such bipolar transistors, an epitaxial layer must be formed on the silicon substrate 1a, and to reduce crystal defects of the epitaxial layer, the substrate 1a must have the off-angle. Namely, the silicon wafer must be sliced at a slight offset such that the principal plane of the substrate is inclined, i.e., has an off-angle, by several degrees with respect to planes (110) and (100).

When the substrate having the off-angle is anisotropically etched, a pair of slant faces (for example, slant faces 18 and 19 in FIGS. 3 and 4) extending from the sides of the diaphragm 4a are differently inclined with respect to the principal plane of the substrate by the amount of the off-angle. If the off-angle is 3 degrees in FIGS. 3 and 4, the slant face 18 has an angle of 32.3 degrees and the slant face 19 an angle of 38.3 degrees with respect to the principal plane (110).

As a result, the center s of the etching start surface, that is, the surface of the substrate before etching to form the diaphragm is started, that agrees with the gauge center g in the direction orthogonal to the principal plane may not agree with the center of the diaphragm 4a, i.e, the center "b" of an etching end surface S1, that is, the surface of the substrate appearing after it is etched to form the diaphragm. Due to this, a pair of the strain gauges arranged, in particular, in the center of the diaphragm 4a on opposite sides of the bridge circuit may achieve unequal strain-resistance characteristics to adversely influence the output characteristics of the bridge circuit.

SUMMARY OF THE INVENTION

An object of the invention is to provide a semiconductor pressure sensor that remarkably improves the accuracy of temperature compensation.

Another object of the invention is to provide a semiconductor pressure sensor having improved output characteristics, comprising a diaphragm anisotropically etched from a silicon substrate having an off-angle, and strain gauges disposed on the diaphragm to form a bridge circuit.

In order to accomplish the objects, a semiconductor pressure sensor according to an aspect of the invention comprises a silicon substrate having a surface orientation of substantially (110) or (100), a diaphragm formed from the substrate, strain gauges disposed on the diaphragm, and a base joined with the substrate, wherein the diaphragm has an octagonal shape whose sides are orthogonal to axis <100>, <110>, and <111>, respectively. The substrate is allowed to have an off-angle of several degrees with respect to the plane of (110) or (100). This sort of off-angle is preferable to grow an epitaxial layer on the substrate and to form integrated transistors in the epitaxial layer.

According to another aspect of the invention, there is provided a semiconductor pressure sensor comprising a semiconductor substrate whose principal plane has a predetermined off-angle with respect to a plane (110) or (100), a diaphragm formed by anisotropically etching the semiconductor substrate, and a plurality of strain gauges symmetrically arranged on the diaphragm, in which the symmetry center of the strain gauges agrees with the center of the bottom of the diaphragm in a direction orthogonal to the principal plane.

According to still another aspect of the invention, a polygonal shape formed on the etching start surface of the substrate is asymmetric when turned half a round, that is, when the shape is rotated by 180 degrees with respect to its longitudinal axis extending in the direction of the off-angle inclination, while the shape of the diaphragm is symmetric when turned half a round.

The semiconductor pressure sensor according to the invention is applicable for other sensors such as semiconductor humidity sensors having an anisotropically etched diaphragm and strain gauges symmetrically arranged on the diaphragm to form a bridge circuit.

The inventors have found through calculations carried out according to a finite element method on experimentally fabricated sensors that the semiconductor presure sensor having the octagonal diaphragm according to the invention can alleviate the distribution of thermal stress in the diaphragm, compared with the conventional semiconductor pressure sensor having a square diaphragm, silicon substrate, and a base that is joined with the substrate and which has a different thermal expansion coefficient from the substrate.

Namely, the semiconductor pressure sensor having an octagonal diaphragm of the invention having the surface orientation of (110) is not affected by changes in temperature and can minimize output error.

In the semiconductor pressure sensor having an octagonal diaphragm of the invention, the strain gauges are spaced apart from one another by predetermined distances, symmetrically arranged on the diaphragm, and connected to form a bridge circuit, so that a gauge center, which is an intermediate point of the strain gauges, agrees, in a direction orthogonal to the principal plane, with the center of the etching end surface instead of the center of the etching start surface.

As a result, although the center of the etching start surface does not agree with the center of the etching end surface in the direction orthogonal to the principal plane when anisotropically etching the silicon substrate, the strain gauges are symmetrically arranged along the principal plane around the center of the actually formed diaphragm, i.e., around the center b of the etching end surface. Accordingly, the output characteristics of the strain gauges do not fluctuate.

The semiconductor pressure sensor of the invention involving the off-angle in the silicon substrate, therefore, realizes accuracy in the bridge circuit thereof, which is comparable to that realized by a silicon substrate having no off-angle.

The off-angle of the silicon substrate of the invention enables an epitaxial layer with substantially no defects to be formed on the principal plane of the substrate, to thereby secure excellent properties of bipolar transistors formed in the epitaxial layer because the properties of the transistors are greatly influenced by the quality of the epitaxial layer. These bipolar transistors are used to form sense amplifier and a temperature compensation circuit.

Resistances of the strain gauges do not greatly change in response to stress, while an signal-to-noise (SN) ratio of an output voltage of the bridge circuit is influenced by various noises picked up by wiring between the strain gauges and the sense amplifier, etc. According to the invention, the epitaxial layer having excellent quality secures the properties of the transistors and greatly reduces the length of wiring between the sense amplifier, etc., and the strain gauges, because the transistors for the sense amplifier, etc., are integrated.

Compared with the conventional pressure sensor provided with a separate sense amplifier, or a sense amplifier and strain gauges integrated on a silicon substrate having no off-angle, the present invention greatly improves the SN ratio and reduces costs.

BRIEF DESCRIPTION OF THE DRAWINGS

FIG. 1(a) is a plan view showing a substrate of a conventional semiconductor pressure sensor;

FIG. 1(b) is a sectional view taken along a line 1(b)—1(b) of FIG. 1(a);

FIG. 1(c) is a sectional view taken along a line 1(c)—1(c) of FIG. 1(a);

FIG. 5(a) is a plan view showing a substrate of a semiconductor pressure sensor according to an embodiment of the invention;

FIG. 5(b) is a sectional view taken along a line 5(b)—5(b) of FIG. 5(a);

FIG. 5(c) is a sectional view taken along a line 5(c)—5(c) of FIG. 5(a);

FIG. 5(d) is a sectional view taken along a line 5(d)—5(d) of FIG. 5(a);

DESCRIPTION OF THE PREFERRED EMBODIMENTS

Embodiments of a semiconductor pressure sensor according to the invention will be explained in detail with reference to the drawings.

[Embodiment 1]

FIGS. 5 to 13 show a semiconductor pressure sensor according to the first embodiment of the invention.

Figure 2:
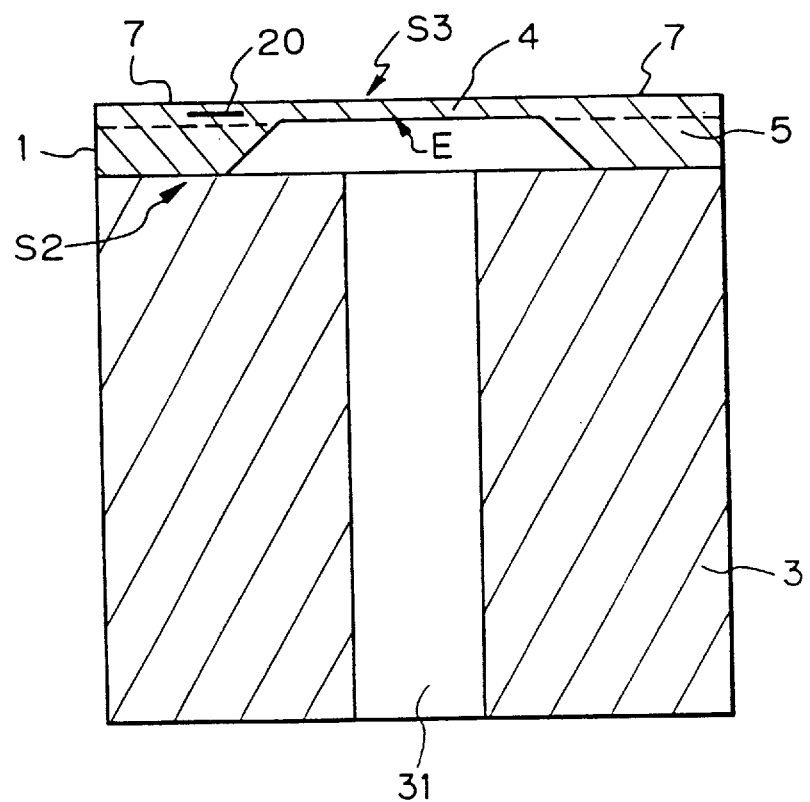
FIG. 2 is a sectional view showing a conventional semiconductor pressure sensor.
Figure 3:
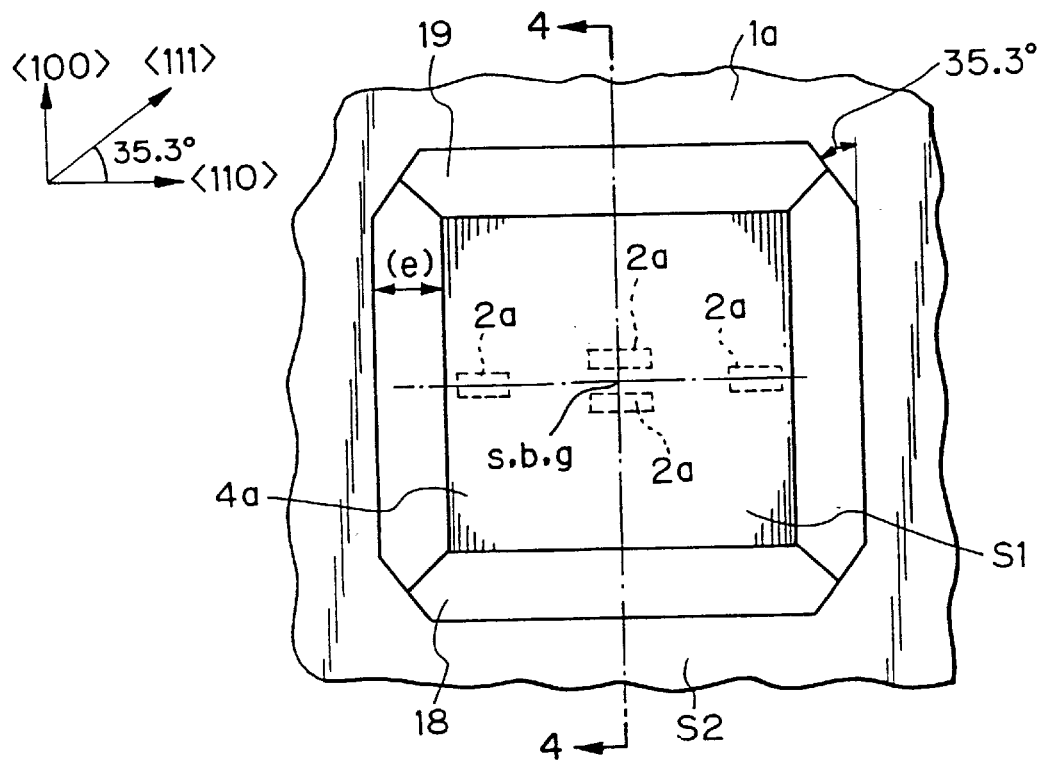
FIG. 3 is a plan view showing a part of a diaphragm of a conventional semiconductor pressure sensor.
Figure 4:
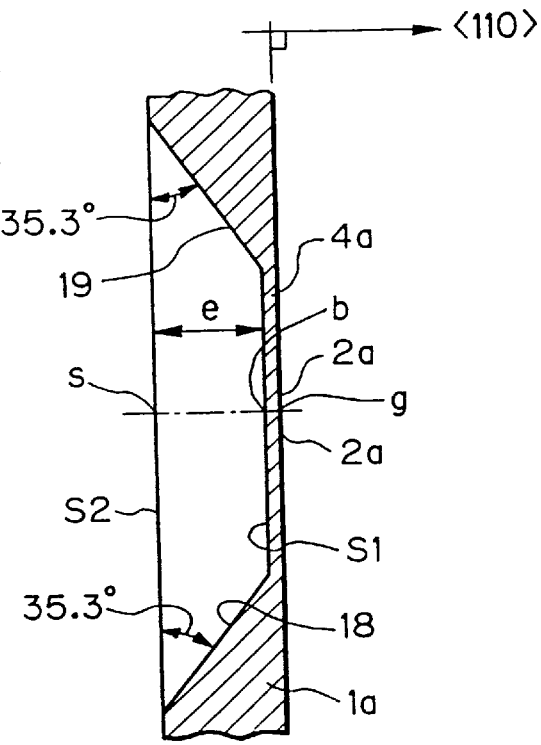
FIG. 4 is a sectional view taken along a line 4—4 of FIG. 3.

Similar to the semiconductor pressure sensor shown in FIG. 2, the semiconductor pressure sensor of this embodiment comprises a substrate 1 and a base 3. The substrate 1 has a diaphragm 4. The substrate 1 is made of monocrystalline silicon chip diced into a square shape each side of which is about 3 mm. The base 3 is made of Pyrex (trade name) glass. The base 3 is bonded with a non-diaphragm area 7 of substrate 1, or more particularly, with a surface of a substrate base 5 of the substrate, 1 on the periphery of the diaphragm 4 utilizing an anodic bonding method. The base 3 has a pressure introducing hole 31 through which pressure to be measured is introduced to a recessed face of the diaphragm 4. At this time, a reference pressure is applied to a flat face of the diaphragm 4.

The substrate base 5 is the portion of the substrate left after the substrate 1 is etched, and protrudes toward the base 3 from the etching end surface E.

As shown in FIGS. 5(a) to 5(d), the substrate 1 is about 0.3 mm thick and has a surface orientation of substantially (110). The diaphragm 4 anisotropically etched in the center of the substrate 1 has an octagonal shape. The diaphragm 4 is about 40 micrometers thick and defined by sides that are orthogonal to axes <100>, <110>, and <111>, respectively. Each first side 11 is about 0.54 mm long, each second side 12 about 0.84 mm long, and each third side 13 about 0.48 mm long.

Figure 8:
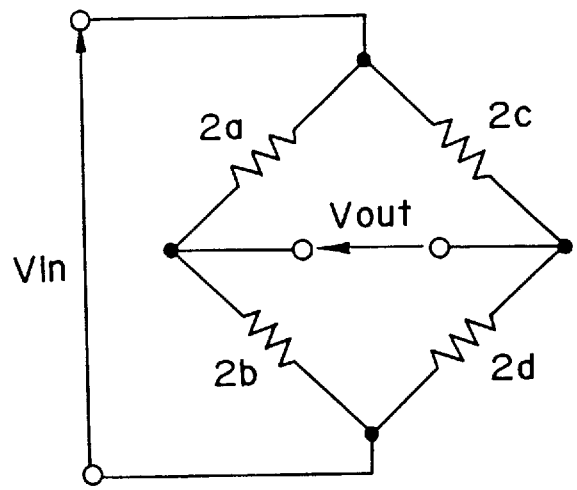
FIG. 8 is a circuit diagram showing a bridge circuit according to the invention.

Four strain gauges 2a to 2d are formed by doping impurities having an opposite conduction type to that of the substrate 1, to the peripheral and central regions of the diaphragm 4. The strain gauges 2a to 2d are connected to form a bridge circuit as shown in FIG. 8.

Examples of processes of fabricating the semiconductor pressure sensor according to the invention will be explained.

A standard semiconductor process technique is used to form the strain gauges 2a to 2d on a monocrystalline silicon wafer having a surface orientation of substantially (110). Thereafter, wiring and passivation are carried out, and contact holes and bonding pads are formed. The strain gauges 2a to 2d are symmetrically arranged around an axis <110> passing through the center of the diaphragm 4. Longitudinal axes of the strain gauges are oriented along the axis <110>. The strain gauges 2a and 2d are arranged on the periphery of the diaphragm 4, while the strain gauges 2b and 2c are arranged in the center thereof.

Figure 6:
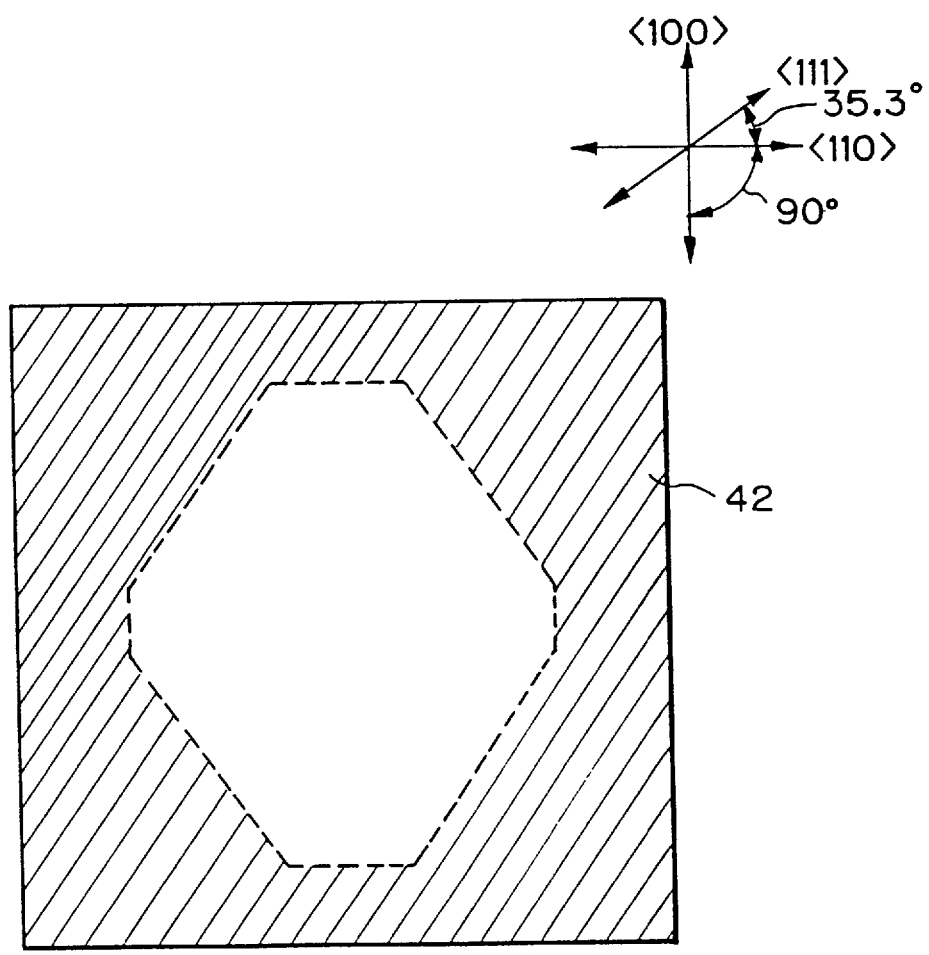
FIG. 6 is a plan view showing an etching mask used for fabricating the semiconductor pressure sensor according to the embodiment.

A photolithography method is used to form an etching mask such as an oxide film on the back of the wafer, as shown in FIG. 6. The wafer is then anisotropically etched with, for example, KOH water solution. As a result, the diaphragm 4 is shaped into an octagon defined by straight lines orthogonal to axis <100>, <110>, and <111>, as shown in FIG. 5(a).

FIGS. 5(b) to 5(d) show sectional views along respective principal planes of the octagonal diaphragm 4, in which FIG. 5(b) shows a sectional view of the diaphragm 4 taken along a line 5(b)—5(b) extending in parallel with the axis <110>. In FIG. 5(b), each end of the diaphragm is inclined by about 45 degrees. FIG. 5(c) shows a sectional view of the diaphragm 4 taken along a line 5(c)—5(c) orthogonal to the axis <111>. In FIG. 5(c), each end of the diaphragm 4 is substantially vertical. FIG. 5(d) shows a sectional view of the diaphragm 4 taken along a line 5(d)—5(d) extending parallel with the axis <100>. In FIG. 5(d), each end of the diaphragm 4 is inclined by about 35 degrees.

The wafer is diced and joined with the base 3 made of Pyrex glass utilizing an anodic bonding method, and bonding pads and input/output pins are bonded to the diced wafer with gold wires, etc.

Since the structure and the fabrication processes of this kind of semiconductor pressure sensor are well known, they will not be repeatedly explained here.

A thermal error offset voltage occurring at an output terminal of the bridge circuit (FIG. 8) will be explained.

A difference in the thermal expansion coefficients between the base 3 and the substrate 1 and between the substrate 1 and the oxide and passivation film 5 formed on the substrate 1 cause thermal stress in the diaphragm 4. This thermal stress fluctuates to cause the thermal error offset voltage.

Figure 9:
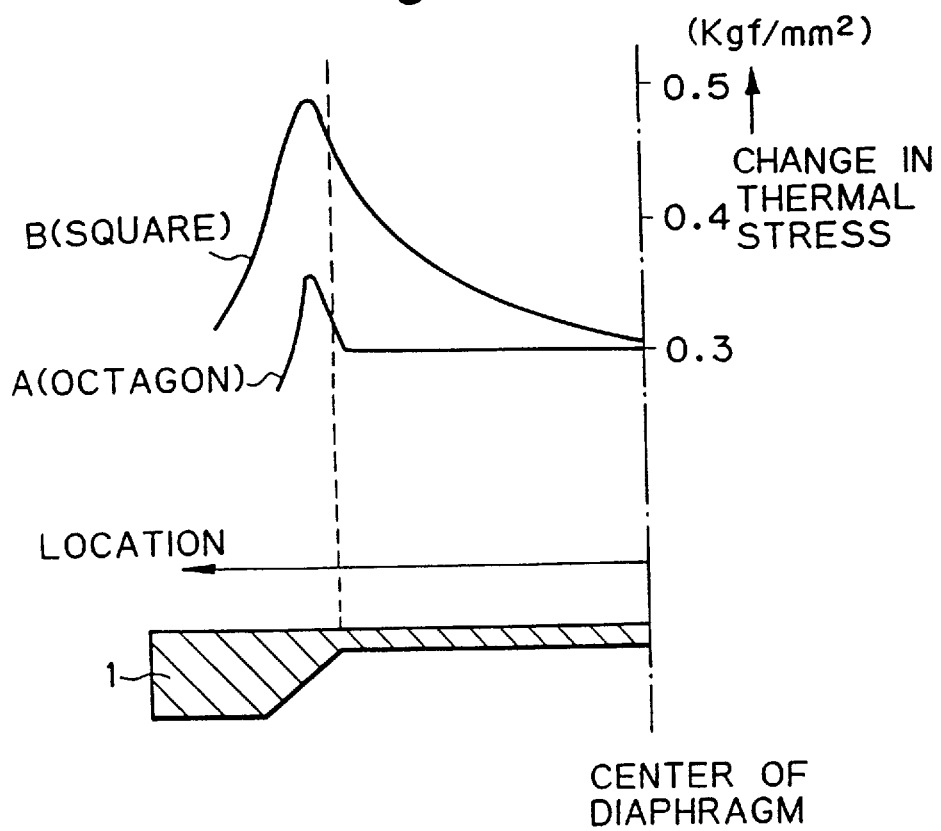
FIG. 9 is a diagram showing thermal stress distributions in a diametral direction of diaphragms.

FIG. 9 shows a distribution of thermal stress caused by the Pyrex base in the diametral direction of the diaphragm 4 and analyzed according to a finite element method. In the figure, a curve A represents a distribution of thermal stress in the diametral direction of the semiconductor pressure sensor according to the embodiment, and a curve B represents a distribution of thermal stress in the diametral direction of the conventional semiconductor pressure sensor of FIG. 1 whose diaphragm has a square shape having an equal distance between opposite sides. The analysis of FIG. 9 was carried out with a temperature difference of 100° C., a difference in the thermal expansion coefficient of $1 \times 10^{-7}$ [°$C.^{-1}$], and a pressure difference of 0.

As shown in FIG. 9, thermal stress in the diaphragm 4 of the semiconductor pressure sensor A of the embodiment fluctuates only slightly compared with the conventional semiconductor pressure sensor B. In particular, the thermal stress at the center of the diaphragm 4 of the embodiment is substantially equal to that at the periphery. This means that an output terminal Vout of the bridge circuit of the embodiment may provide substantially no thermal error offset voltage.

According to the embodiment, the difference of thermal stress between the strain gauges 2b and 2c disposed in the center of the diaphragm 4 and the strain gauges 2a and 2d disposed on the periphery of the diaphragm 4 is very small thereby remarkably reducing the thermal error offset voltage.

In the bridge circuit of FIG. 8, a total offset voltage Vout(p=0) including the thermal error offset voltage is expressed as follows:

$$Vout(p=0)=Vin \cdot (Rb \cdot Rc - Ra \cdot Rd)/\{(Ra+Rb) \cdot (Rc+Rd)\}$$

where Ra, Rb, Rc, and Rd are resistances of the strain gauges 2a, 2b, 2c, and 2d, respectively. It is assumed here that the pressure difference p applied to the diaphragm 4 is zero. The resistances of the strain gauges 2a to 2d change depending on the thermal stress as well as the temperature coefficients TCRs of the strain gauges themselves.

When a thermal expansion coefficient of the Pyrex glass $\alpha p = 3.2 \times 10^{-6}$ [° C.$^{-1}$] and a thermal expansion coefficient of silicon as $\leqq 4.8 \times 10^{-9} T + 2.6 \times 10^{-6}$ [° C.$^{-1}$] at a temperature T [° C.] in a temperature range from room temperature to about 150° C., thermal strain $|\epsilon T|$ is expressed as follows:

$$|\epsilon T| = \left| \int_{TB}^{T} (\alpha p - \alpha s) dT \right|$$

$$\approx |-2.4 \times 10^{-9} \cdot T^2 + 0.6 \times 10^{-6} \cdot T + \epsilon 0|$$

where TB is a temperature at which the substrate 1 is joined with the base 3, and $\epsilon 0$ is thermal strain at a temperature T of 0° C. In this way, the thermal strain has temperature dependency.

In the above equation, the quadratic component for the temperature T is a nonlinear component of the temperature dependency of the thermal strain, and as explained before, this nonlinear component causes more problems than an absolute value of the thermal strain in compensating temperature.

The thermal strain $|\epsilon T|$ due to a temperature change changes the resistances of the strain gauges 2a to 2d. In the bridge circuit of the strain gauges 2a to 2d, fluctuations in the resistances of the strain gauges 2a to 2d (in particular, the difference of the thermal strain between the peripheral gauges 2a and 2d and the central gauges 2b and 2c) actually cause the thermal error offset voltage (mainly, a thermal stress output), as will be understood from the above equation of the offset voltage Vout(p=0).

Figure 10:
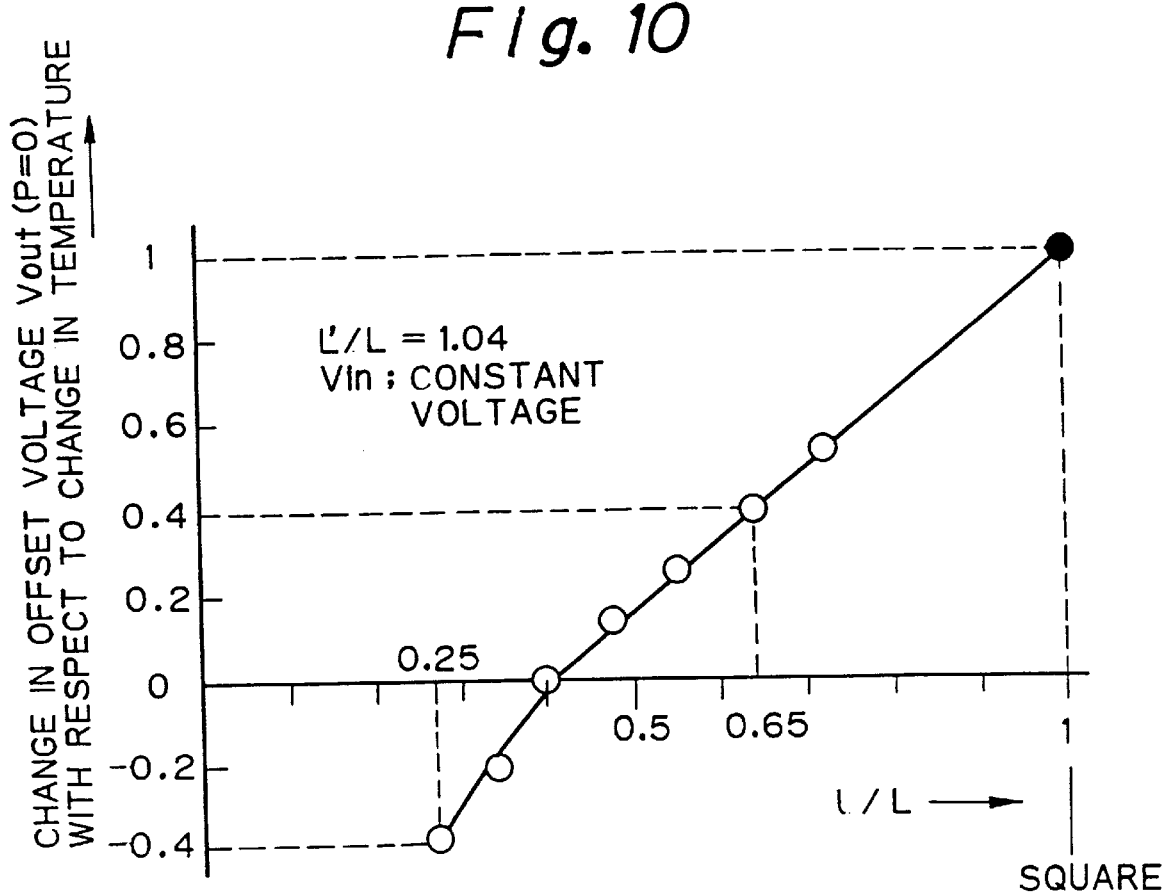
FIG. 10 is a diagram showing changes in an offset voltage of a bridge circuit with respect to a change in temperature.
Figure 11:
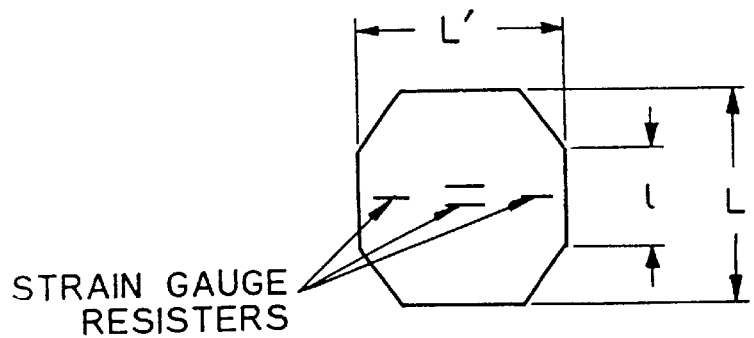
FIG. 11 is a view showing dimensions of the sample shown in FIG. 10.

Various semiconductor pressure sensors according to the embodiment were experimentally fabricated. Diaphragms of these sensors had different side length ratios. A fluctuation in the thermal error offset voltage with respect to a change in temperature was measured on each of these sensors. For the purpose of comparison, a sensor having a square diaphragm of identical side length was fabricated. FIG. 10 shows a result of the measurement, in which the sensor for comparison is adjusted to a value of 1. In the measurement, a pressure difference on both sides of a diaphragm was 0, the temperature was changed from 25° C. to 120° C., the length of each first side 11 of the diaphragm was l, a distance between second sides 12 that are parallel with each other and orthogonal to the first sides was L, a distance between the first sides 11 that are parallel with each other was L', and a ratio L'/L was 1.04 (FIG. 11).

It is understood from FIG. 10 that the fluctuation becomes zero when l/L=0.4. The curve of FIG. 10, however, may be changed more or less depending on the passivation film, the thickness of the diaphragm, etc.

Figure 7A:
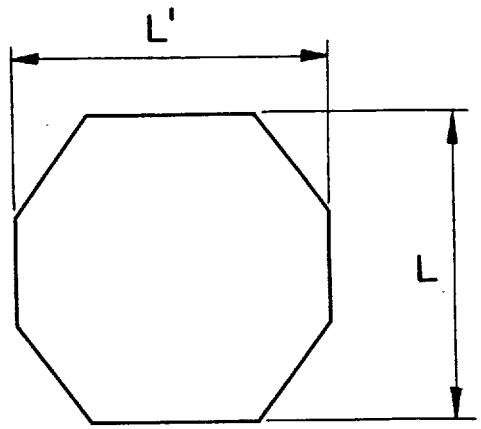
FIGS. 7(a) and 7(b) are views showing preferred specifications of the semiconductor pressure sensor according to the invention.
Figure 7B:
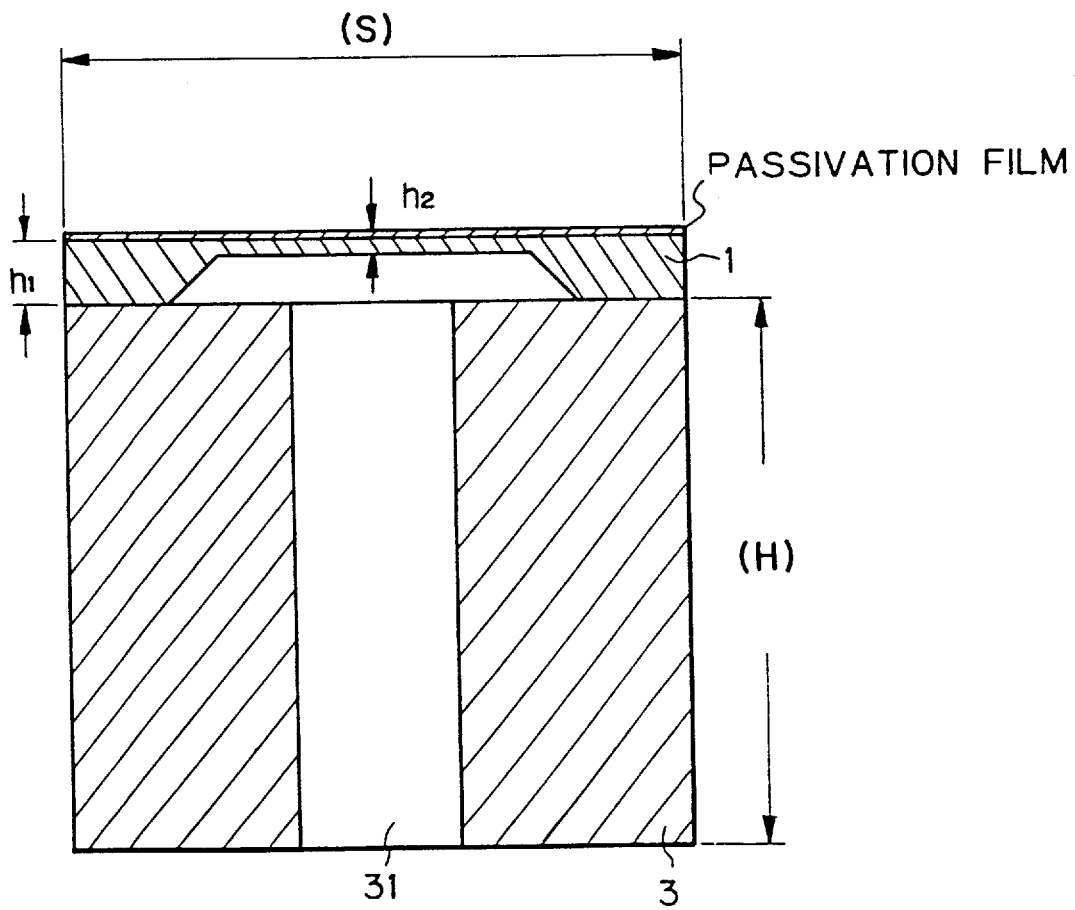

FIG. 7 shows examples of specifications of the semiconductor pressure sensor according to the invention.

The base 3 is made of, for example, borosilicate glass such as Pyrex (trade mark), and has a substantially square shape each side of which is 2.5 to 5.5 mm in width (S) and 1 to 5 mm in height (H). The base 3 has the pressure guiding center hole 31 for communicating the diaphragm 4 with the outside. The diameter $\phi$ of the hole 31 is preferably about 0.5 to 1.5 mm.

The silicon substrate 1 having the octagonal diaphragm 4 is joined with the top of the base 3. The thickness (h1) of the substrate 1 is 200 to 400 micrometers, and the thickness (h2) of the diaphragm 4 is 20 to 60 micrometers. A passivation film (oxide etc.) f of 0.1 to 2 micrometers thick is formed on the surface of the substrate 1.

The diaphragm 4 may have a shape close to an octagonal shape or any other shape. It is preferable that the outer diameters L and L' of the octagonal diaphragm 4 are 1.0 to 3.0 mm each, and L=L' or L'/L$\leqq$1.04.

Based on the result of the measurement shown in FIG. 10, the actual specifications of the semiconductor pressure sensor will be discussed.

A semiconductor pressure sensor for a vehicle is designed for a full-scale output of 40 mV min. (in a specified pressure range, for example, from 0 to 750 mHg for controlling an engine), and an offset output fluctuation Vout(p=0) of ±1 mV max. (corresponding to an output when the applied pressure p is zero), when the pressure sensor has the conventional square diaphragm (l/L=1).

To keep the offset error within ±1% for a standard temperature range from −30° C. to 125° C., the following must be established:

(offset error of square pressure sensor)·x=±0.01

(wherein in x denotes a fluctuation of offset voltage Vout (p=0) for temperature change)=±0.01

{(1 mV)/(40 mV)}·x=±0.01 (1%)

x=±0.4 (40%)

Namely, Vout(p=0) must be reduced to ±40% of the fluctuation of the pressure sensor having the square diaphragm (l/L=1). In this case, l/L must be brought within a range of 0.25 to 0.65, as is understood from FIG. 10. The characteristic curve of FIG. 10 may change more or less depending on the position and size of each gauge, and the size of a chip. The fluctuation, however, will never deteriorate the measuring accuracy of the sensor, if the sensor maintains the specifications explained with reference to FIG. 7.

In the above embodiment, the surface orientation of the silicon semiconductor substrate 1 is (110). The invention is also applicable for a semiconductor substrate having a surface orientation of (100).

The semiconductor substrate having a surface orientation of (110) is, however, preferable. The reason of this will be explained.

Figure 13:
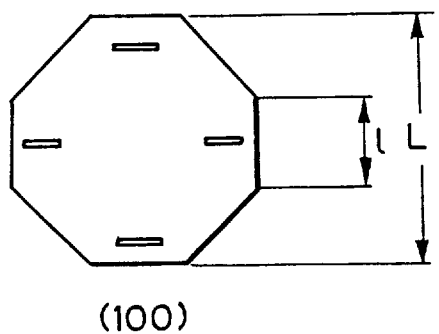
FIG. 13 is a view showing dimensions of the sample shown in FIG. 12.

Compared with the silicon substrate of surface orientation of (100), the silicon substrate of surface orientation of (110) is more linear with respect to pressure, i.e., it has better linearity to simplify a signal processing circuit. Although such nonlinearity may be compensated for to some extent by adjusting the positions and sizes of strain gauges, the strain gauges on the substrate of surface orientation (100) must be arranged on the periphery of the diaphragm as shown in FIG. 13 but cannot be linearly arranged in the center thereof like those on the substrate of surface orientation (110). The strain gauges on the substrate of surface orientation (100) are, therefore, difficult to simulate.

Figure 12:
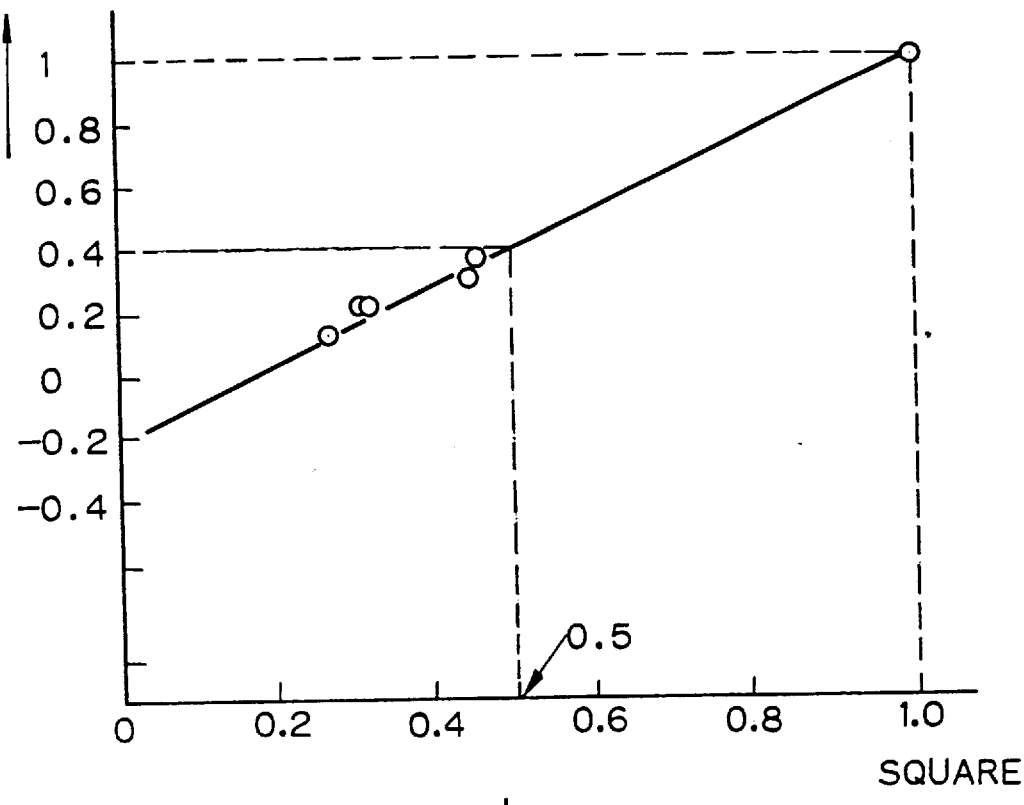
FIG. 12 is a diagram showing changes in an offset voltage of a pressure sensor using a semiconductor that is different from the semiconductor of FIG. 10.

FIG. 12 is a view showing a result of measurement of a fluctuation of offset voltage Vout with respect to a temperature change, of a semiconductor pressure sensor having an octagonal shape fabricated according to the invention but using the silicon substrate of surface orientation (100). The measurement was carried out in a manner similar to FIG. 10. As shown in the FIG. 12, the fluctuation Vout(p=0) of this semiconductor pressure sensor becomes zero when l/L is in a range of about 0.1 to 0.2. In consideration of the previous example, a preferable range will be 0<l/L<0.5.

According to the embodiment, the strain gauges 2a to 2d are formed by doping impurities to the surface (110) of the monocrystalline silicon substrate. Instead, these strain gauges may be polysilicon resistors formed on the diaphragm 4.

A substrate of surface orientation of (110) may be adhered to a monocrystalline silicon substrate of surface orientation of (100), and strain gauge resistances may be formed on the substrate of surface orientation (100).

For etching substrates, various materials may be adopted instead of the KOH water solution.

The base 3 may be made of any suitable material instead of the Pyrex glass.

According to the embodiment, the four strain gauges 2a to 2d forming the bridge circuit are disposed on the diaphragm 4. The same effect may be achieved by arranging a half-bridge circuit involving a combination of the strain gauges 2a and 2b, or 2c and 2d.

As explained above, a semiconductor pressure sensor according to the embodiment comprises a monocrystalline silicon substrate having a surface orientation of substantially (110), an octagonal diaphragm formed from the substrate, and a base. Each first side of the diaphragm has a length of l, and a distance between two second sides of the diaphragm is L. By changing a ratio of l/L, an influence of thermal stress can be optionally changed. This embodiment, therefore, not only eliminates a thermal stress output but also optionally changes the thermal stress output. Namely, the embodiment positively uses the thermal stress output to compensate for the influence of temperature on the pressure sensitivity of the sensor. (This, however, is not perfect compensation because the pressure sensitivity is a matter completely different from the offset voltage.) In this way, the semiconductor pressure sensor of this embodiment provides an output signal substantially free from the influence of temperature change.

[Embodiment 2]

A semiconductor pressure sensor according to the second embodiment of the invention will be explained with reference to FIGS. 14 and 15.

Figure 14:
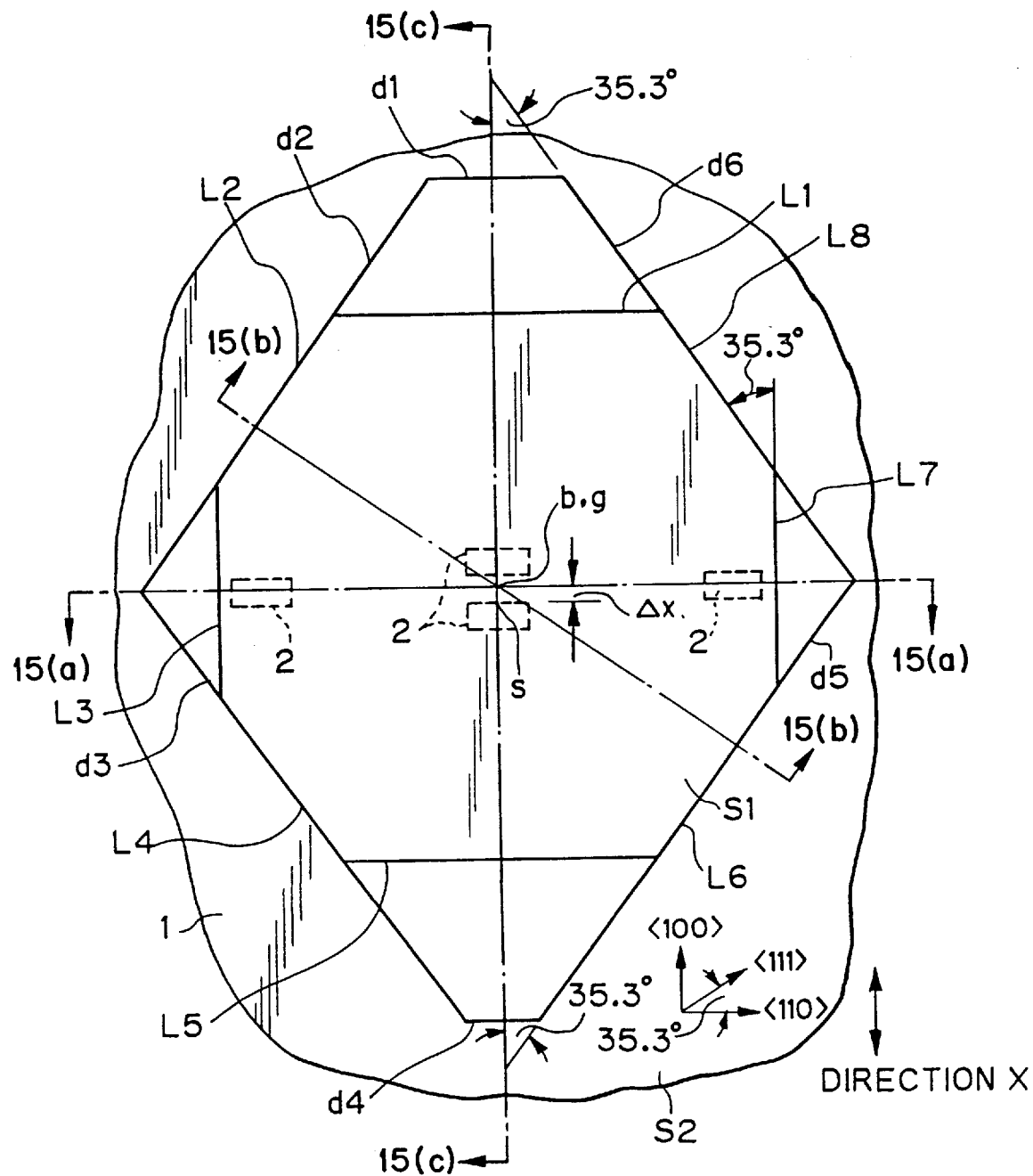
FIG. 14 is a plan view showing a part of a semiconductor pressure sensor according to another embodiment of the invention.

This embodiment anisotropically etches a semiconductor silicon substrate 1 whose principal plane has a predetermined off-angle with respect to a plane (110) or (100), to thereby form an octagonal diaphragm 4 for a pressure sensor, as shown in FIG. 14. The basic arrangement of this embodiment is nearly the same as that shown in FIGS. 2 and 5.

Figure 15A:
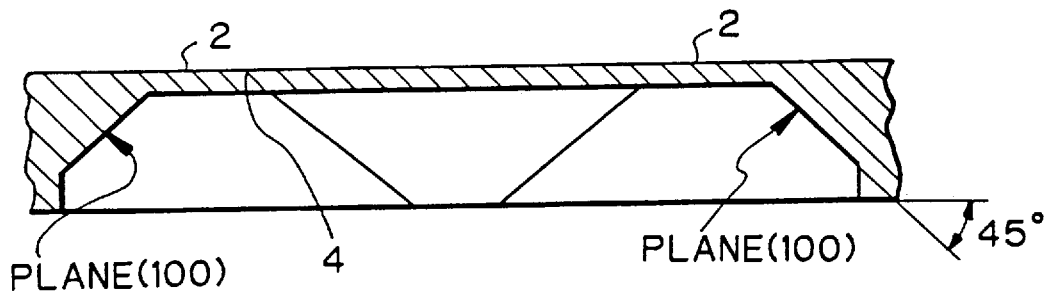
FIG. 15(a) is a sectional view taken along a line 15(a)—15(a) of FIG. 14.
Figure 15B:
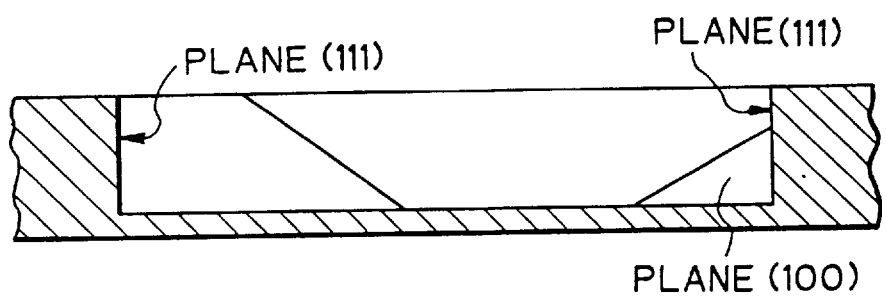
FIG. 15(b) is a sectional view taken along a line 15(b)—15(b) of FIG. 14.
Figure 15C:
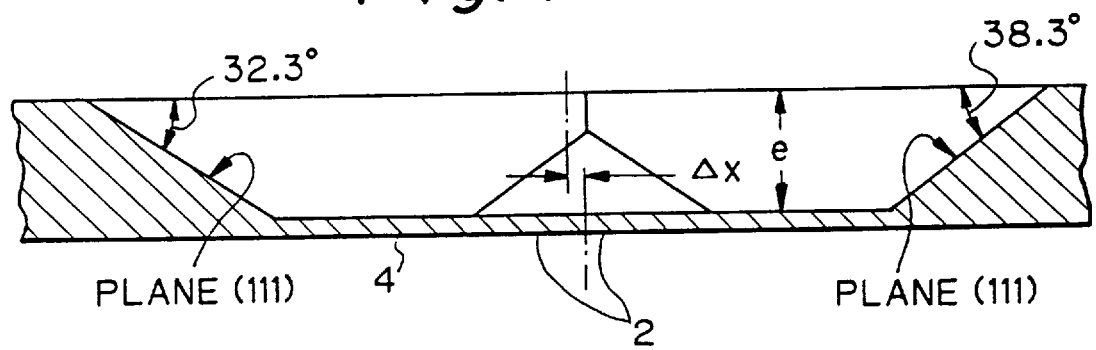
FIG. 15(c) is a sectional view taken along a line 15(c)—15(c) of FIG. 14.
Figure 15C:
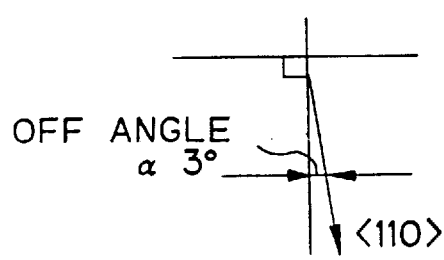

FIG. 15(a) is a sectional view taken along a line 15(a)—15(a) of FIG. 14, FIG. 15(b) a sectional view taken along a line 15(b)—15(b) of FIG. 14, and FIG. 15(c) a sectional view taken along a line 15(c)—15(c) of FIG. 14. As shown in FIG. 15(c), the semiconductor substrate 1 of this embodiment has an off-angle of 3 degrees.

Similar to the sensor shown in FIG. 2, the sensor of the second embodiment includes a bipolar integrated circuit 20 formed on a front principal plane S3 of a non-diaphragm area 7 of the substrate 1. This bipolar integrated circuit 20 involves a sense amplifier for amplifying an output voltage of a bridge circuit, a temperature compensation circuit for compensating the amplified output voltage for temperature, and a power amplification circuit for amplifying power of the temperature compensated voltage.

The details of the diaphragm 4 of the second embodiment will be explained.

The thickness of the diaphragm 4 is about 40 micrometers. The bottom, i.e., an etching end surface S1 of the diaphragm 4 is defined by eight sides L1 to L8. The length of each of the sides L1 and L5 is about 0.84 mm, that of each of the sides L2, L4, L6, and L8 is about 0.48 mm, and that of each of the sides L3 and L7 is about 0.54 mm.

An etching start surface S2 of the substrate 1 is anisotropically etched into a hexagonal recess defined by sides d1 to d6. When viewed orthogonally to the etching start surface S2, the side L2 substantially agrees with the side d2, L4 with d3, L6 with d5, and L8 with d6. (They are slightly shifted from each other due to the influence of the off-angle.) The side L1 is in parallel with the side d1, and L5 with d4.

What is important in this embodiment is that strain gauges 2 are symmetrically arranged around the center of the diaphragm 4 defined by the etching end surface S1, i.e., around the center b of the etching end surface S1, and that, although the etching start surface S2 of the substrate has the off-angle, the parallel sides L1 and L5, L2 and L6, L3 and L7, and L4 and L8 have equal lengths, respectively. As a result, when the diaphragm 4 is turned by 180 degrees around the center b of the etching end surface S1, the strain gauges 2 return to an original layout. On the etching start surface S2 of the substrate 1, however, the parallel sides d1 and d4 have different lengths.

Figure 16:
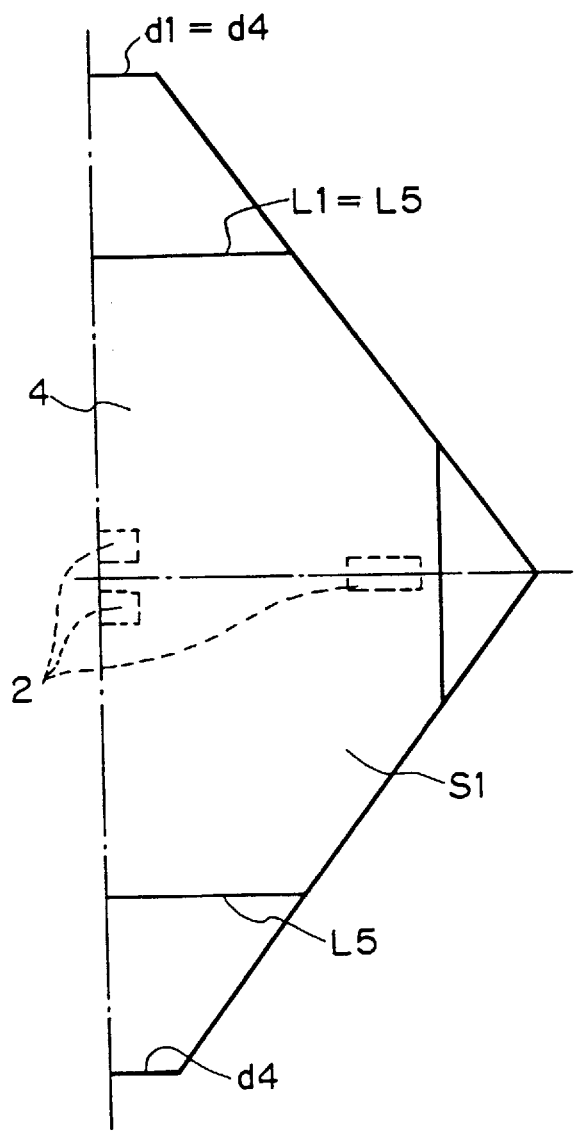
FIG. 16 is a plan view showing a part of a semiconductor pressure sensor having no off-angle, for comparison purposes.
Figure 17:
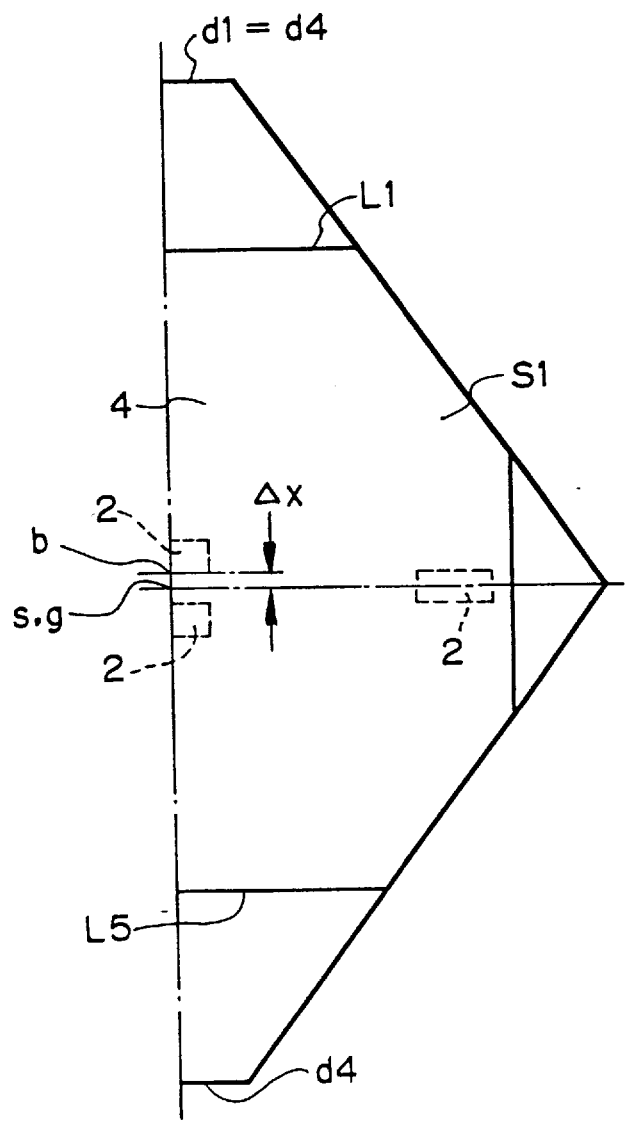
FIG. 17 is a plan view showing a part of a semiconductor pressure sensor having an off-angle, for comparison purposes.

For comparison, FIG. 16 shows a diaphragm 4 anisotropically etched, with the use of a rotation symmetrical photo mask, from a substrate having a surface orientation of (110) and no off-angle, and FIG. 17 shows a diaphragm 4 anisotropically etched, with the use of a rotation symmetrical photo mask, from a substrate having a surface orientation of (110) and an off-angle of 3 degrees.

To provide the same shape as the diaphragm 4 of FIG. 14, sides d1 and d4 of an etching start surface S2 of FIG. 16 are equal in length. As a result, L1=L5.

When the substrate of FIG. 17 having the surface orientation of (110) and off-angle of 3 degrees is anisotropically etched with the same mask pattern as in FIG. 16 with sides d1 and d4 having an equal length, a side L1 will be shorter than a side L5. As a result, the center s of the etching start surface, i.e., a gauge center g does not agree with the center b of the etching end surface S1.

According to the embodiment, the center b of the etching end surface S1, i.e., the center of the diaphragm is adjusted to the gauge center g, and the sides d1 and d4 are adjusted such that the sides L1 and L5 have the same length. The octagonal shape of the diaphragm improves the offset temperature characteristics of the pressure sensor, compared with the square diaphragm.

In FIG. 14, a reference mark $\Delta x$ is a distance between an intermediate point (the center s of the etching start surface) between the sides d1 and d4 in a direction x and the center b of the etching end surface, i.e., the gauge center g. This distance $\Delta x$ is calculated as follows:

$$\Delta x = (e/2) \cdot \{[(1/\tan(35.3°-\alpha)] - [1/\tan(35.3°+\alpha)]\}$$

where e is the depth of the anisotropic etching, and a the off-angle. When the side L1 has a length of L1, the side L2 a length of L2, the side d1 a length of l1, and the side d4 a length of l2, the following is established:

$$L1 = l1 + 2e\{\tan 35.3°/\tan(35.3°+\alpha)\}$$

$$L2 = l2 + 2e\{\tan 35.3°/\tan(35.3°-\alpha)\}$$

When L1=L2:

$$l1 - l2 = 2e \cdot \tan 35.3° \cdot \{[1/\tan(35.3°-\alpha)]$$

$$-[1/\tan(35.3°+\alpha)]\}$$

According to this calculation, a photo mask pattern for the diaphragm is prepared. In the above equations, 35.3° means $\tan^{-1}(1/\sqrt{2})$.

Processes of fabricating a semiconductor pressure sensor according to the invention will be explained with reference to FIGS. 18 to 24.

Figure 18:
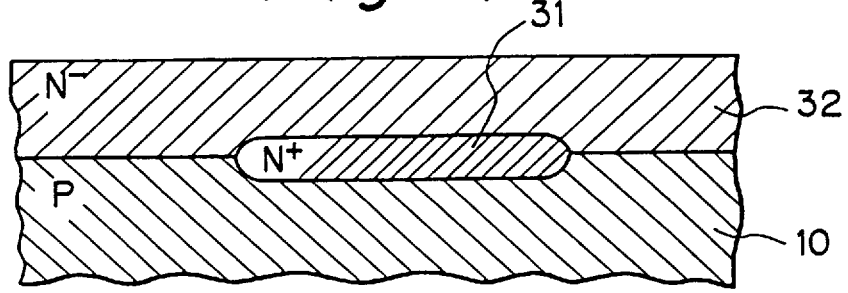
FIGS. 18 to 24 are sectional views explaining examples of processes of fabricating a semiconductor pressure sensor according to the invention.

A p-type silicon substrate 10 having a surface orientation of (110) and an off-angle of 3 degrees is prepared. A high-concentration n-type region 31 for a buried collector, etc., is formed in a predetermined area (a non-diaphragm area 7 where a diaphragm 4 is not formed) on the surface of the substrate 10 according to oxidation, photolithography, and impurity diffusion processes. A low-concentration n-type epitaxial layer 32 for a collector region, etc., is grown on the surface of the silicon substrate 10 (FIG. 18).

Figure 19:
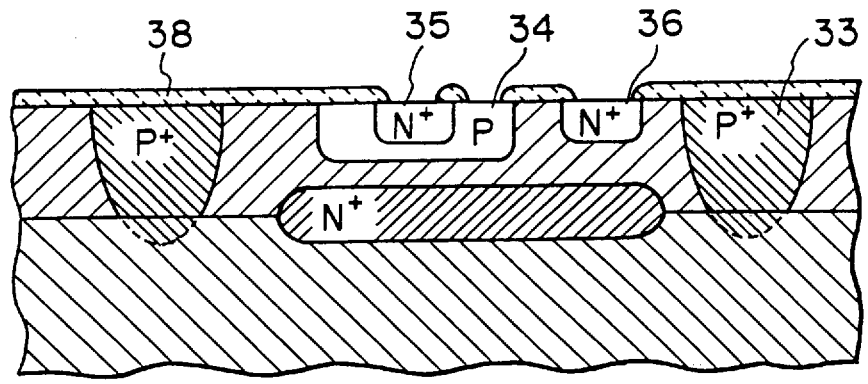
Figure 20:
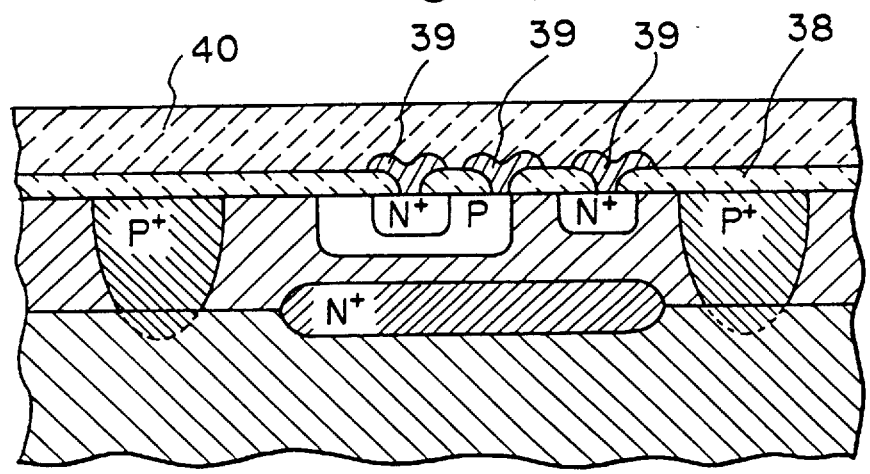

A high-concentration p-type region 33 for isolating a pn junction of a bipolar transistor is formed by diffusing impurities. Thereafter, a p-type base region 34, high-concentration n-type emitter region 35, and high-concentration n-type collector region 36 are formed by oxidation, photolithography, and impurity diffusion processes (FIG. 19).

Figure 21:
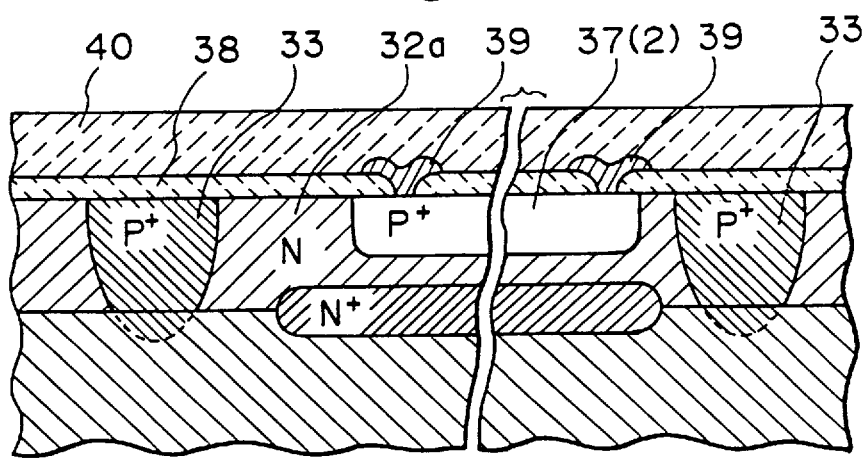

The low-concentration n-type epitaxial layer 32 is partitioned by the high-concentration p-type region 33, to form a strain gauge region 32a where the diaphragm 4 is to be formed. In the strain gauge region 32a, a high-concentration p-type region 37 is formed strain gauges 2 (FIG. 21). The strain gauges 2 may be formed when the p-type base region 34 or the high-concentration n-type emitter region 35 is formed.

Contact holes are opened through a silicon oxide film 38 formed on the surface of the substrate 10, and electrode wiring 39 is arranged through the contact holes. Thereafter, a PSG film 40, for example, is deposited for passivation. In the processes of forming the bipolar transistor and strain gauges 2, various resistors are formed to provide a required bipolar integrated circuit.

Figure 22:
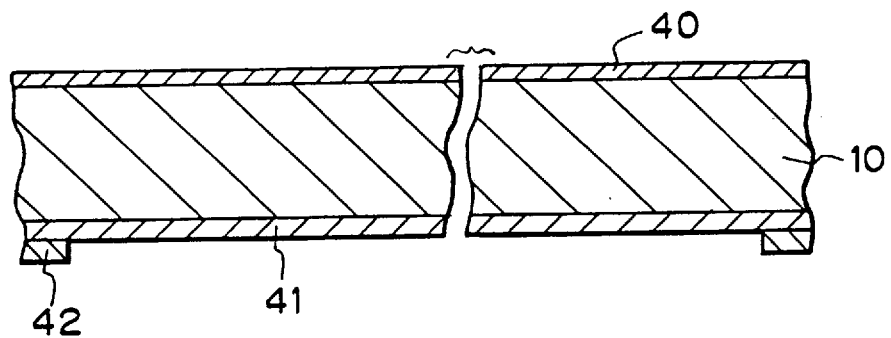
Figure 23:
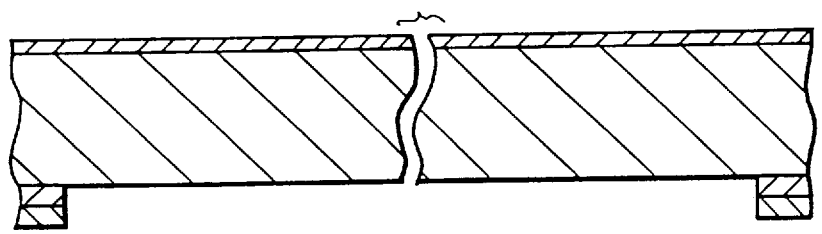
Figure 24:
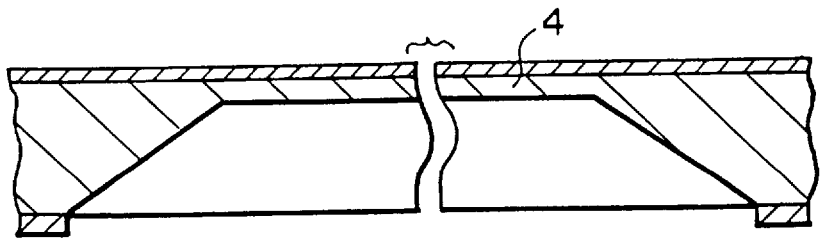

An octagonal photoresist 42 is formed on a planned region on the back principal face of the wafer where an insulation film 41, such as an oxide film, is formed (FIG. 22). The insulation film 41, which is made of an oxide film or a nitride film, and serves as an etching mask, is selectively opened (FIG. 23). After removing the photoresist 42, the silicon substrate 10 is anisotropically etched with KOH water solution, etc., to form an octagonal diaphragm 4 shown in FIG. 14 (FIG. 24).

The substrate is diced, joined with a base 3 made of Pyrex glass utilizing an anodic bonding method, and bonded to bonding pads and input/output pins with gold wires, etc.

In the above explanation, the substrate having the surface orientation of (110) and off-angle of 3 degrees is anisotropically etched. The invention is also applicable for a silicon substrate having a surface orientation of (100) and an off-angle of 3 degrees. In this case, the distance Ax is calculated as follows:

$$\Delta x=(e/2)\cdot\{[(1/\tan(54.7°-\alpha)]-[1/\tan(54.7°+\alpha)]\}$$

where 54.7° means $(90°-\tan^{-1}(1/\sqrt{2}))$.

I claim:

1. A method of fabricating a semiconductor pressure sensor comprising the steps of:

forming a semiconductor substrate having a principal plane inclined with respect to one of planes (110) and (100);

forming semiconductor strain gauges on one side of the substrate;

providing an etching mask having an opening on a film disposed on a side of the substrate opposite the one side on which the semiconductor strain gauges are formed;

selectively removing the film according to the etching mask to form an etching opening in the film; and anisotropically etching the semiconductor substrate through the opening with use of an etching liquid to form a diaphragm in the semiconductor substrate and peripheral faces adjacent the diaphragm, the peripheral faces being inclined with respect to the principal plane, wherein a center of an etching start surface of the substrate prior to etching is shifted from a center of the diaphragm after etching.

2. A method according to claim 1, wherein the etching start surface center is shifted from the center of the diagraphm by a distance determined according to an amount by which the principal plane of the substrate is inclined with respect to one of planes (110) and (100) as well as a depth to which the substrate is anisotropically etched.

3. A method according to claim 2, wherein the etching mask has one of a hexagonal and octagonal shape having a longitudinal axis extending in a direction of inclination of the principal plane of the substrate, two parallel, sides of the mask being orthogonal to the direction of inclination and each being shorter than either of two parallel sides of the diaphragm that are orthogonal to the direction of inclination, the mask having a center line extending in the direction of inclination being longer than a distance between two parallel sides of the diaphragm extending in the direction of inclination, and other sides of the mask partly overlapping with respective other sides of the diaphragm.

4. A method according to claim 3, wherein a difference (l1−l2) in a length of the two parallel sides of the mask that are orthogonal to the direction of inclination is defined as follows:

$$l1-l2=2e\cdot\tan\theta\cdot\{[1/\tan(\theta-\alpha)]-[1/\tan(\theta+\alpha)]\}$$

where e is a depth of the anisotropic etching, and θ is an angle determined according to a surface orientation of the principal plane of the semiconductor substrate, wherein θ=35.3° when the surface orientation of the principal plane is (110).

5. A method of fabricating a semiconductor pressure sensor comprising the steps of:

forming a semiconductor substrate having a principal plane inclined with respect to one of planes (110) and (100):

forming semiconductor strain gauges on one side of the substrate;

providing an etching mask having an opening on a film disposed on a side of the substrate opposite the one side on which the semiconductor strain gauges are formed;

selectively removing the film according to the etching mask to form an etching opening in the film; and anisotropically etching the substrate through the etching opening with use of an etching liquid to form a diaphragm in the substrate and peripheral faces adjacent the diaphragm, the peripheral faces being inclined with respect to the principal plane wherein a center of an etching start surface is shifted from a center of an etching end surface by a distance Δx, which is defined as follows:

$$\Delta x=(e/2)\cdot\{[(1/\tan(\theta-\alpha)]-[1/\tan(\theta+\alpha)]\}$$

where e is a depth of the anisotropic etching, α is an angle at which the principal plane is inclined with respect to one of the planes (110) and (100), and θ is an angle determined by an orientation of the principal plane of the semiconductor substrate, wherein θ=35.3° when a surface orientation of the principal plane is (110) and θ=54.7° when the surface orientation of the principal plane is (100).

6. A method according to claim 1 or 5, wherein said semiconductor substrate forming step includes:
   forming a semiconductor substrate of a first conductivity type; and
   forming an epitaxial layer on the semiconductor substrate.

7. A method according to claim 6, wherein the epitaxial layer is of a second conductivity type opposite the first conductivity type, the method further comprising a step of:
   forming a processing circuit which processes outputs of the semiconductor strain gauges in the epitaxial layer.

8. A method of fabricating a semiconductor pressure sensor comprising the steps of:
   forming a semiconductor substrate having a principal plane inclined with respect to one of planes (110) and (100);
   forming a plurality of semiconductor strain gauges within a region on one side of the semiconductor substrate;
   forming a plurality of circuitry elements for amplifying outputs of the strain gauges within a region other than the region on the semiconductor substrate;
   providing an etching mask having an opening on the etching mask disposed on a side of the semiconductor substrate opposite the one side on which the semiconductor strain gauges are formed;
   selectively removing the etching mask according to the etching mask to form an etching opening in the etching mask;
   anisotropically etching the semiconductor substrate through the etching opening with use of an etching liquid to form a diaphragm in the semiconductor substrate and peripheral faces adjacent to the diaphragm, the peripheral faces being inclined with respect to the principal plane; and
   joining a base with the semiconductor substrate having the diaphragm.

9. A method according to claim 8, wherein, a center of an etching start surface is shifted from a center of an etching end surface by an offset distance Δx, which is defined as follows:

$$\Delta x = (e/2) \cdot \{[1/\tan(\theta-\alpha)] - [1/\tan(\theta+\alpha)]\}$$

where e is a depth of the anisotropic etching, Δ is an angle at which the principal plane is inclined with respect to one of the planes (110) and (100), and θ is an angle determined by a surface orientation of the principal plane of the semiconductor substrate, wherein θ=35.3° when the surface orientation of the principal plane is (110) and θ=54.7° when the surface orientation of the principal plane is (100).

10. A method according to claim 8, wherein a center of an etching start surface of the substrate prior to etching is shifted from a center of the diaphragm after etching by an offset distance.

11. A method according to claim 10, wherein the offset distance is determined according to an amount by which the principal plane of the substrate is inclined with respect to one of planes (110) and (100) as well as a depth to which the substrate is anisotropically etched.

12. A method according to claim 11, wherein the etching mask has one of a hexagonal and octagonal shape having a longitudinal axis extending in a direction of inclination of the principal plane of the substrate, two parallel sides of the mask being orthogonal to the direction of inclination and each being shorter than either of two parallel sides of the diaphragm that are orthogonal to the direction of inclination, the mask having a center line extending in the direction of inclination being longer than a distance between two parallel sides of the diaphragm extending in the direction of inclination, and other sides of the mask partly overlapping with respective other sides of the diaphragm.

13. A method according to claim 12, wherein a difference (l1−l2) in a length of the two parallel sides of the mask that are orthogonal to the direction of inclination is defined as follows:

$$l1 - l2 = 2e \cdot \tan\theta \cdot \{[1/\tan(\theta-\alpha)] - [1/\tan(\theta-\alpha)]\}$$

where e is a depth of the anisotropic etching, and θ is an angle determined according to a surface orientation of the principal plane of the semiconductor substrate, wherein θ=35.3° when the surface orientation of the principal plane is (110).

* * * * *